(12) United States Patent
Gao et al.

(10) Patent No.: US 11,829,247 B2
(45) Date of Patent: Nov. 28, 2023

(54) METHOD, DEVICE, AND COMPUTER PROGRAM PRODUCT FOR REBUILDING DATA OF A FAILED STORAGE DEVICE IN A STORAGE SYSTEM

(71) Applicant: EMC IP Holding Company LLC, Hopkinton, MA (US)

(72) Inventors: Hongpo Gao, Beijing (CN); Jian Gao, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 176 days.

(21) Appl. No.: 16/819,785

(22) Filed: Mar. 16, 2020

(65) Prior Publication Data
US 2020/0341845 A1    Oct. 29, 2020

(30) Foreign Application Priority Data

Apr. 25, 2019   (CN) .................. 201910341002.X

(51) Int. Cl.
*G06F 11/10* (2006.01)
*G06F 11/20* (2006.01)
(Continued)

(52) U.S. Cl.
CPC ........ *G06F 11/1092* (2013.01); *G06F 3/0607* (2013.01); *G06F 3/0614* (2013.01);
(Continued)

(58) Field of Classification Search
CPC ............. G06F 11/1092; G06F 11/2069; G06F 3/0649; G06F 3/0689; G06F 3/0614; G06F 9/5011; G06F 3/0607; G06F 2209/5011
See application file for complete search history.

(56) References Cited

U.S. PATENT DOCUMENTS 9,235,486 B1 *  1/2016  Casaburi ............. G06F 11/1612
10,444,993 B2  10/2019  Han et al.
10,788,986 B2   9/2020  Han et al.
(Continued)

OTHER PUBLICATIONS

Ramesh Natarajan, RAID 10 Vs RAID 01 (RAID 1+0 Vs RAID 0+1) Explained with Diagram, Oct. 24, 2011 https://www.thegeekstuff.com/2011/10/raid10-vs-raid01/ (Year: 2011).*

(Continued)

*Primary Examiner* — Charles Rones
*Assistant Examiner* — Alexander Vinnitsky
(74) *Attorney, Agent, or Firm* — BainwoodHuang

(57) ABSTRACT

Techniques manage a storage system. Along these lines, a failed storage device is detected among storage devices included in a resource pool of the storage system, and the storage devices belong to a first group and a second group in the resource pool respectively. An extent in the failed storage device assigned for building a stripe in the storage system is determined. A spare reserved extent is selected from respective reserved extents included in respective storage devices among the storage devices based on a mapping relation between the stripe and a plurality of extents in the stripe. The respective reserved extents are shared among the first group and the second group. Data in the extent are rebuilt to the selected spare reserved extent. A reserved storage area can be shared among various storage devices in the resource pool, so as to increase allocatable space in storage devices.

14 Claims, 11 Drawing Sheets

(51) Int. Cl.
*G06F 3/06* (2006.01)
*G06F 9/50* (2006.01)

(52) U.S. Cl.
CPC .......... *G06F 3/0649* (2013.01); *G06F 3/0689* (2013.01); *G06F 9/5011* (2013.01); *G06F 11/2069* (2013.01); *G06F 2209/5011* (2013.01)

(56) References Cited

U.S. PATENT DOCUMENTS

| | | |
|---|---|---|
| 11,003,374 B2 | 5/2021 | Han et al. |
| 11,232,005 B2 | 1/2022 | Lv et al. |
| 2004/0177218 A1* | 9/2004 | Meehan ................ G06F 3/0616 714/E11.034 |
| 2018/0018096 A1* | 1/2018 | Fekete .................. G06F 3/0689 |
| 2019/0196911 A1* | 6/2019 | Satoyama ............. G06F 3/0619 |

OTHER PUBLICATIONS

Paul Massiglia, Raidbook, 1st edition, Jun. 9, 1993 (Year: 1993).*

* cited by examiner

METHOD, DEVICE, AND COMPUTER PROGRAM PRODUCT FOR REBUILDING DATA OF A FAILED STORAGE DEVICE IN A STORAGE SYSTEM

CROSS REFERENCE TO RELATED APPLICATION

This application claims priority to Chinese Patent Application No. CN201910341002.X, on file at the China National Intellectual Property Administration (CNIPA), having a filing date of Apr. 25, 2019, and having "METHOD, DEVICE, AND COMPUTER PROGRAM PRODUCT FOR MANAGING STORAGE SYSTEM" as a title, the contents and teachings of which are herein incorporated by reference in their entirety.

FIELD

Various implementations of the present disclosure generally relate to storage management, and more specifically, to a method, device and computer program product for managing reserved storage areas in a storage system (e.g., Redundant Array of Independent Disks (RAID)).

BACKGROUND

With the development of data storage techniques, various data storage devices now provide users with increasingly large data storage capacity, and their data access speed has been improved greatly. With the increase of data storage capacity, users also impose greater demands on data reliability and response time of storage systems. So far a variety of data storage systems based on Redundant Arrays of Independent Disks (RAID) have been developed to improve reliability of data. When one or more disks in a storage system fail(s), data in failed disk(s) can be recovered from other normal disk.

Mapped Redundant Array of Independent Disks (mapped RAID) has been developed. In the mapped RAID, a disk is a logical concept and may include multiple extents. Multiple extents comprised in one logical disk may be distributed over different physical storage devices in a resource pool. Regarding multiple extents in one stripe of the mapped RAID, they are supposed to be distributed over different physical storage devices, so that when a physical storage device where one extent among the multiple extents resides fails, a rebuild operation may be performed so as to recover data from a physical storage device where other extent resides.

It will be understood when a storage device in the resource pool fails, in order to ensure data in the failed storage device can be quickly rebuilt to a spare storage space in the resource pool, usually reserved storage areas need to be arranged in various storage devices in the resource pool. However, reserved storage areas cannot be utilized effectively while the storage system is running normally.

SUMMARY

Therefore, it is desirable to develop and implement a technical solution for managing a storage system more effectively. It is desired that the technical solution can be compatible with an existing storage system and manage the storage system more effectively by reconstructing various configurations of the existing storage system.

According to a first aspect of the present disclosure, there is provided a method for managing a storage system. In the method, a failed storage device is detected among a plurality of storage devices included in a resource pool of the storage system, the plurality of storage devices belong to a first group and a second group in the resource pool respectively. An extent in the failed storage device which has been assigned for building a stripe in the storage system is determined. A spare reserved extent is selected from respective reserved extents included in respective storage devices among the plurality of storage devices based on a mapping relation between the stripe and a plurality of extents in the stripe, the respective reserved extents are shared among the first group and the second group. Data in the extent are rebuilt to the selected spare reserved extent.

According to a second aspect of the present disclosure, there is provided a device for managing a storage system, including: at least one processor; a volatile memory; and a memory coupled to the at least one processor, the memory having instructions stored thereon, the instructions, when executed by the at least one processor, causing the device to perform acts. The acts include: detecting a failed storage device among a plurality of storage devices included in a resource pool of the storage system, the plurality of storage devices belonging to a first group and a second group in the resource pool respectively; determining in the failed storage device an extent which has been assigned for building a stripe in the storage system; selecting a spare reserved extent from respective reserved extents included in respective storage devices among the plurality of storage devices based on a mapping relation between the stripe and a plurality of extents in the stripe, the respective reserved extents being shared among the first group and the second group; and rebuilding data in the extent to the selected spare reserved extent.

According to a third aspect of the present disclosure, there is provided a computer program product. The computer program product is tangibly stored on a non-transient computer readable medium and includes machine executable instructions which are used to implement a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION

Figure 1A:
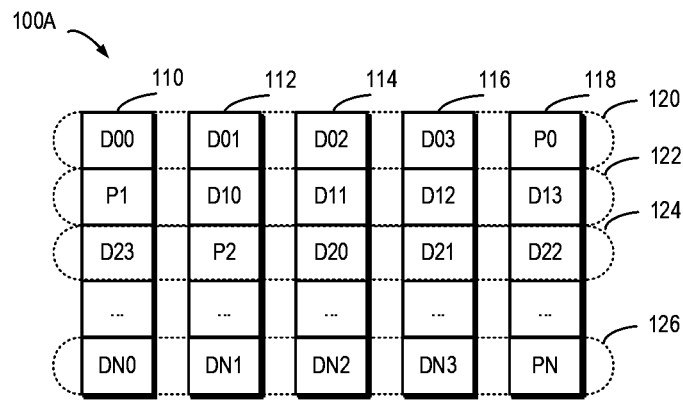
FIGS. 1A and 1B each illustrate a schematic view of a storage system in which a method of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

In the context of the present disclosure, the storage system may be a RAID-based storage system. The RAID-based storage system may combine multiple storage devices into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

FIG. 1A schematically illustrates a schematic view of a storage system 100A in which a method of the present disclosure may be implemented. In the storage system shown in FIG. 1A, working principles of RAID are illustrated by taking a RAID-5 (4D+1P, where 4D represents that 4 storage devices are included in the storage system for storing data, and 1P represents that 1 storage device is included in the storage system for storing parity) array that include five independent storage devices (110, 112, 114, 116 and 118) as an example. It should be noted although five storage devices are schematically shown in FIG. 1A, in other implementations more or less storage devices may be comprised according to different levels of RAID. Moreover, although FIG. 1A illustrates stripes 120, 122, 124, . . . 126, in other examples the RAID system may further include a different number of stripes.

In RAID, a stripe crosses multiple physical storage devices (for example, the stripe 120 crosses storage the devices 110, 112, 114, 116 and 118). The stripe may be simply construed as a storage area among multiple storage devices which satisfies a given address range. Data stored in the stripe 120 includes multiple parts: a data block D00 stored in the storage device 110, a data block D01 stored in the storage device 112, a data block D02 stored in the storage device 114, a data block D03 stored in the storage device 116, and a data block P0 stored in the storage device 118. In this example, the data blocks D00, D01, D02 and D03 are stored data, and the data block P0 is a P parity of the stored data.

The mode of storing data in other stripes 122 and 124 is similar to that in the stripe 120, and the difference is that the parity about other data block may be stored in other storage device than the storage device 118. In this way, when one of the multiple storage devices 110, 112, 114, 116 and 118 fails, data in the failed device may be recovered from other normal storage devices.

Figure 1B:
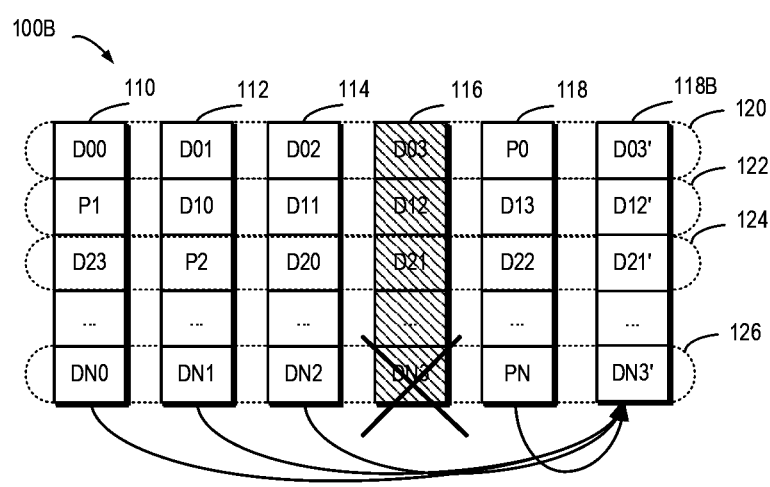

FIG. 1B schematically illustrates a schematic view 100B of rebuilding process of the storage system 100A. As shown in FIG. 1B, when one storage device (e.g. the shaded storage device 116) fails, data may be recovered from the other storage devices 110, 112, 114 and 118 that operate normally. At this point, a new backup storage device 118B may be added to RAID to replace the storage device 118. In this way, recovered data may be written to 118B, and system rebuilding may be realized.

Note while a RAID-5 storage system including 5 storage devices (among which 4 storage devices are used for storing data and 1 storage device is used for storing parity) has been described with reference to FIGS. 1A and 1B, according to definition of other RAID levels, there may further exist a storage system including a different number of storage devices. On the basis of definition of RAID-6, for example, two storage devices may be used to store parity P and Q respectively. For another example, according to definition of triple-parity RAID, three storage devices may be used to store parity P, Q and R respectively.

Figure 2:
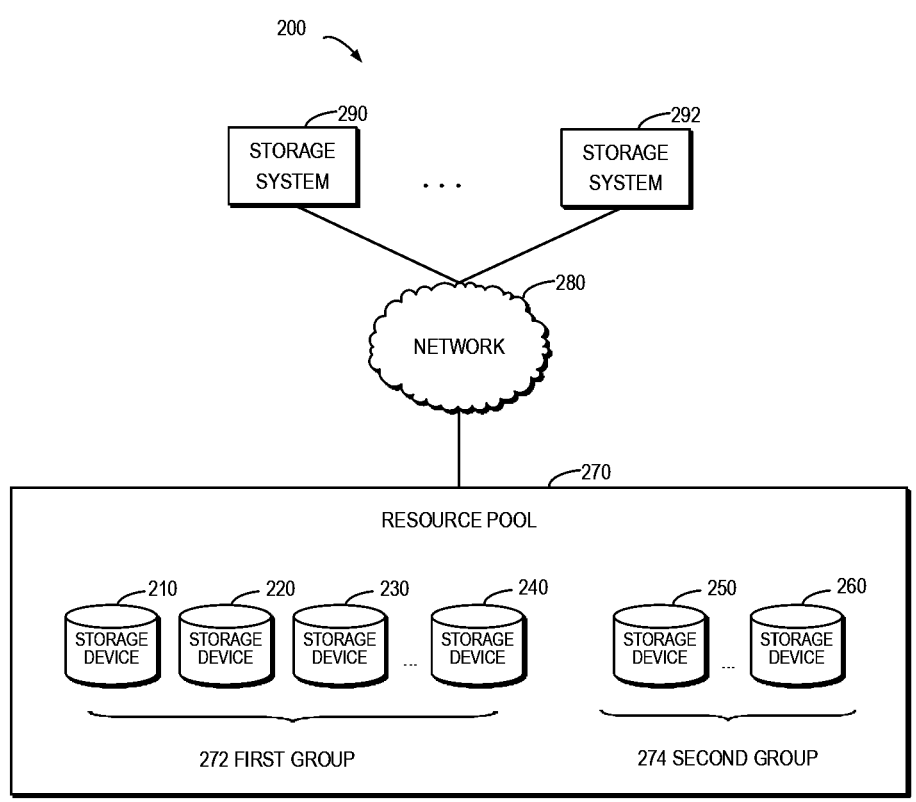
FIG. 2 schematically illustrates a block diagram of an example environment in which a method of the present disclosure may be implemented.

With the development of distributed storage technologies, the various storage devices 110, 112, 114, 116 and 118 in the storage system shown in FIGS. 1A and 1B may be no longer limited to physical storage devices but may be virtual storage devices. For example, respective extents on the storage device 110 may come from different physical storage devices (hereinafter referred to as storage devices for short) in the resource pool. FIG. 2 schematically shows a block diagram of an example environment 200 in which the method of the present disclosure may be implemented. As depicted, a storage resource pool 270 may include multiple physical storage devices 210, 220, 230, 240, 250, . . . , 260. At this point, storage space in the multiple storage devices may be allocated to multiple storage systems 290, . . . , 292. At this point, these storage systems 290, . . . , 292 may access the storage space in the various storage devices in the storage resource pool 270 via a network 280.

It will be understood the resource pool 270 may include a large number of storage devices. The larger the number of storage devices, the greater the probability devices in the resource pool 270 fail. Therefore, various storage devices in the resource pool 270 may be divided into a first group 272 and a second group 274. For example, the first group 272 may include the storage devices 210, 220, 230, . . . , 240, and the second group 274 may include the storage devices 250, . . . , 260.

The minimum of the number of storage devices in a group depends on the type of a storage system. For example, in a 4+1 RAID storage system, the minimum may be set as 4+1=5. For another example, in a 4+2 RAID storage system, the minimum may be set as 4+2=6. Based on historical experience, the maximum of the number of storage devices in a group may be set as 25 or other value. At this point, stripes in the storage system may come from storage devices in the same group. For example, extents in various stripes in the storage system 290 may come from storage devices in the first group 272, and extents in various stripes in the storage system 292 may come from storage devices in the second group 274.

Figure 3:
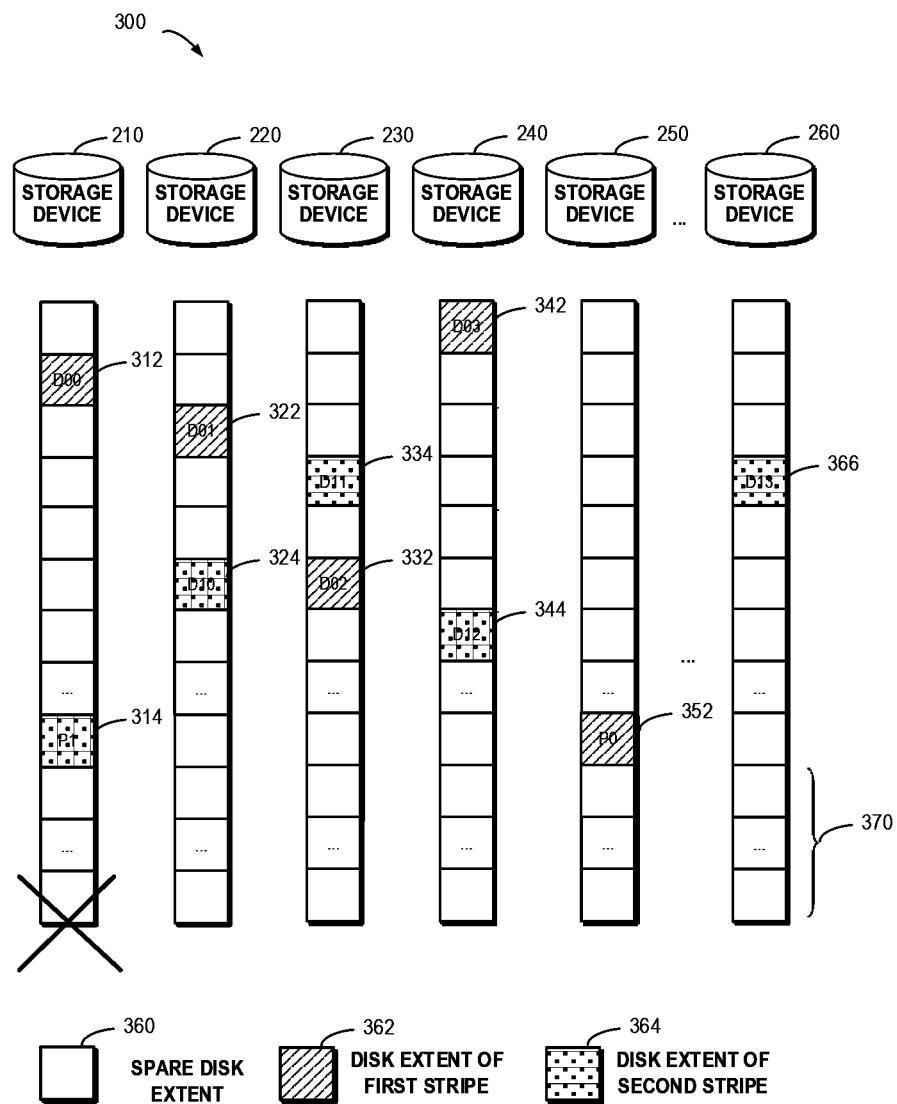
FIG. 3 schematically illustrates a diagram of extents in storage devices in a storage resource pool in FIG. 2.

FIG. 3 schematically shows a diagram of more information of the storage resource pool 270 as shown in FIG. 2. The resource pool 270 may include multiple storage devices 210, 220, 230, 240, 250, . . . , 260. Each storage device may include multiple extents, wherein a blank extent (as shown by a legend 360) represents a spare extent, an extent (as shown by a legend 362) shown with slashes represents an extent for a first stripe of the storage system 110A in FIG. 1, and a shaded extent (as shown by a legend 364) represents an extent for a second stripe of the storage system 110A in FIG. 1. At this point, extents 312, 322, 332, 342 and 352 for the first stripe are for storing data blocks D00, D01, D02, D03 and parity P0 of the first stripe respectively. Extents 324, 334, 344, 366 and 314 for the second stripe are for storing blocks D10, D11, D12, D13 and parity P1 of the second stripe respectively.

As shown in FIG. 3, there may exist a reserved area 370 in respective storage devices, so that when a storage device in the resource pool fails, extents in the reserved area 370 in each storage device may be selected to rebuild various extents in the failed storage device.

Note in FIG. 3 the 4D+1P RAID-5 storage system is taken as an example to illustrate how extents in various stripes are distributed over multiple storage systems in the resource pool. When RAID based on other level is used, those skilled in the art may implement concrete details on the basis of the above described principles. For example, in the 6D+1P+1Q RAID-6 storage system, 8 extents in each stripe may be distributed over multiple storage devices so as to ensure a load balance between the multiple storage devices.

It will be understood when a storage system in the resource pool 270 fails, in order to ensure data in extents in the failed storage device can be recovered to a normal storage device in time, a reserved area may be arranged in each storage device. It will be understood when all extents in a storage device have been allocated, if the storage device fails, all extents in the failed storage device need to be rebuilt. Therefore, the capacity of all reserved storage areas in the group should be equal to the capacity of the failed storage device. Suppose the group include N storage devices and the storage capacity of each storage device is M, at this point the reserved storage area in each storage device will equal M/N.

Figure 4A:
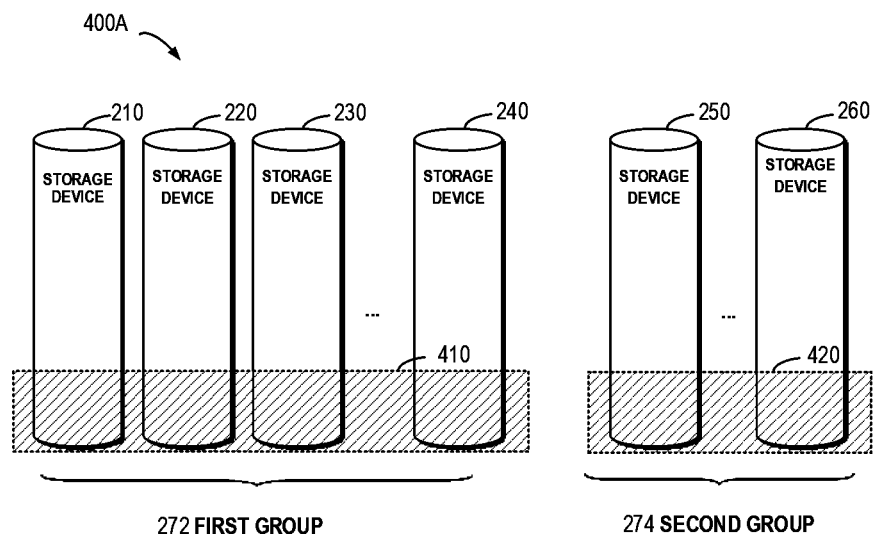
FIG. 4A illustrates a schematic view of reserved storage areas in a storage system according to one technical solution.

With reference to FIG. 4A, the figure shows a schematic view 400A of reserved storage areas in a storage system according to one technical solution. As depicted, for storage devices in the first group 272, a reserved storage area 410 may be arranged. Suppose the capacity of each storage device is M, the first group 272 includes of N1 storage devices and the second group 274 includes N2 storage devices, then at this point the first reserved storage area 410 and the second reserved storage area 420 will have a total of M storage space. Specifically, each storage device in the first group 272 has a reserved storage area with a capacity of M/N1, and each storage device in the second group 274 has a reserved storage area with a capacity of M/N2. As groups in the resource pool increase, the reserved storage area of each group will take up more space.

Figure 4B:
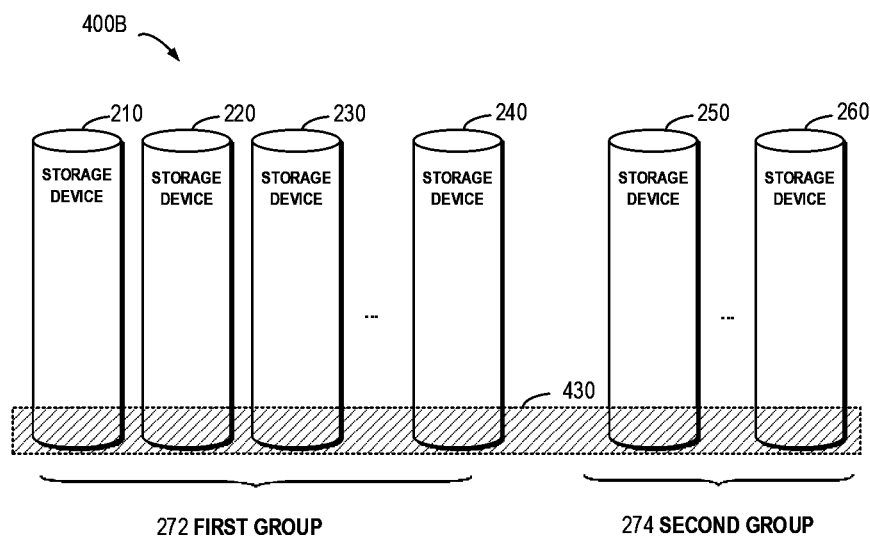
FIG. 4B illustrates a schematic view of a reserved storage area in a storage system according to implementations of the present disclosure.

In order to solve the foregoing drawbacks, implementations of the present disclosure provide a method, device and computer program product for managing a storage system. According to example implementations of the present disclosure, a shared reserved storage area may be arranged for multiple groups. With reference to FIG. 4B, a detailed description is presented below to specific implementations of the present disclosure. FIG. 4B shows a schematic view 400B of a reserved storage area in a storage system according to implementations of the present disclosure.

In FIG. 4B, a reserved storage area 430 shared between various storage devices in the first group 272 and the second group 274 may be denoted as a shaded area. Since only one storage devices among the storage devices 210 to 260 is allowed to fail, when any device in the first group 272 and the second group 274 fails, extents in the failed storage device may be rebuilt to the reserved storage area 430 across partitions.

With the foregoing example implementations, there is no need to arrange a separate reserved storage area for each group, but a shared reserved storage area may be arranged for all groups so as to increase the ratio of allocatable storage space in the resource pool 270. Continuing the foregoing example, where each storage device has a storage space of M, the first group 272 includes N1 storage device and the second group 274 includes N2 storage devices, at this point the reserved storage area 430 will have a storage space totaling M, and each storage device will have a reserved storage area of M/(N1+N2).

Compared with arranging a separate reserved storage area for each group, according to example implementations of the present disclosure, the size of allocatable space in each storage device in the resource pool 270 may be increased, and further storage devices in the resource pool may be leveraged more effectively.

Figure 5:
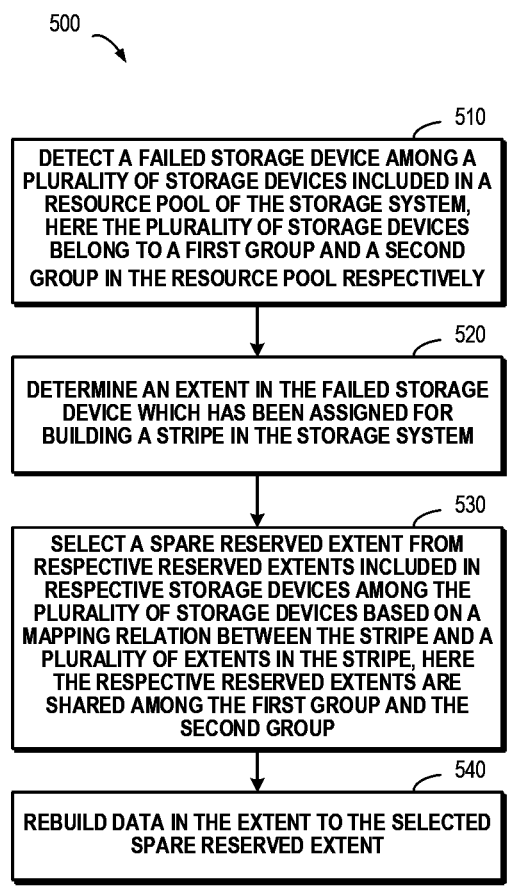
FIG. 5 schematically illustrates a flowchart of a method for managing a storage system according to implementations of the present disclosure.

With reference to FIG. 5, a detailed description is presented below to more details on how to manage a storage system. FIG. 5 schematically shows a flowchart of a method 500 for managing a storage system according to implementations of the present disclosure. At block 510, a failed storage device is detected among multiple storage devices included in a resource pool of the storage system. The multiple storage devices locate in a first group and a second group in the resource pool respectively. It will be understood here the resource pool may be, for example, the resource pool 270 as shown in FIG. 2. The resource pool 270 may include a first group 272 and a second group 274, and each group includes the same or different numbers of storage devices. Where the storage system is 4+1 RAID, the number of storage devices in the groups may be set to 25 as a maximum and 5 as a minimum. For example, the first group 272 may include of 25 storage devices, and the second group 274 may include of 5 storage devices. For another example, the numbers of storage devices in the first group 272 and the second group 274 may be values between 5 and 25.

According to example implementations of the present disclosure, various means may be used to detect the failed device. For example, the response time of a storage device towards an access request may be used to determine whether the device fails or not. During the running of the storage device, the storage device might not be accessed temporarily due to hardware and/or software reasons. Therefore, a predetermined time interval may be set, and when repeated attempts are made to access the storage device but fail several times within the predetermined time interval, it is determined the storage device fails.

At block 520, an extent which has been assigned for building a stripe in the storage system is determined in the failed storage device. It will be understood the storage device may include a large number of extents, whereas only a portion of extents might be allocated for building stripes in the storage system. Only extents which have been allocated include valid data, so at this point a rebuild operation is performed to only these extents.

Figure 6:
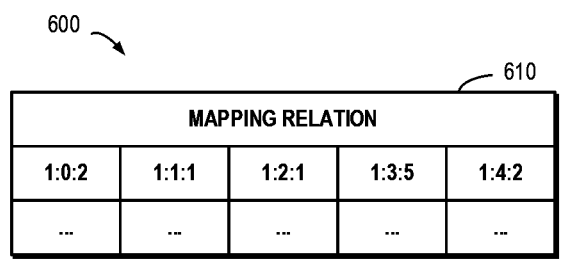
FIG. 6 schematically illustrates a block diagram of a mapping relation between a stripe and multiple extents in the stripe according to implementations of the present disclosure.

It will be understood the storage system may include one or more stripes, and each stripe may include multiple extents. The number of extents here depends on the type of RAID. For example, in a 4D+1P storage system, each stripe may include 5 extents. With reference to FIG. 6, description is presented below to a mapping relation between a stripe and various extents.

FIG. 6 schematically shows a block diagram 600 of a mapping relation between a stripe and multiple extents in the stripe according to implementations of the present disclosure. In FIG. 6, shown are addresses of 5 extents included in a stripe in the storage system. The address may be represented in the form of three sections. For example, regarding an address "1:0:2," the first section represents an identifier of the group is "1," the second section represents an identifier of the storage device is "0," and the third section represents an identifier of the extent is "2." Therefore, the address represents the extent is extent 2 in storage device 0 in group 1.

At block 530, a spare reserved extent is selected from respective reserved extents included in respective storage devices among the multiple storage devices based on a mapping relation between the stripe and multiple extents in the stripe. Here the respective reserved extents are shared between the first group 272 and the second group 274.

According to example implementations of the present disclosure, the storage system is a storage system based on Redundant Array of Independent Disks. In the RAID-based storage system, since only when various extents in a stripe are located in different storage devices, it can be ensured data in the stripe may be recovered. Therefore, when selecting a spare reserved extent from respective reserved extents based on a mapping relation, the spare reserved extent may be selected from respective reserved extents in the multiple storage devices other than respective storage devices where the multiple extents are located.

Regarding the stripe as shown in FIG. 6, a mapping relation 610 indicates respective extents in the stripe are located in: storage devices with identifiers of 0, 1, 2, 3 and 4 in group 1 respectively. At this point, a spare reserved extent may be selected from storage devices other than those with identifiers of 0-4 in the resource pool 270. For example, a spare reserved extent may be selected from a storage device with an identifier of 5 in group 1 in the resource pool 270.

It will be understood since the multiple storage devices in the resource pool 270 are already divided into the first group 272 and the second group 274, for the sake of management, spare reserved extents may be selected from storage devices in the same group preferentially. According to example implementations of the present disclosure, a group to which the failed storage device belongs may be determined; and a spare reserved extent included in a storage device in the determined group may be selected.

Still with reference to the example of the stripe shown in FIG. 6, as seen from the mapping relation 610, all extents in the stripe are located in group 1, at which point a spare reserved extent in a storage device in group 1 may be selected preferentially. The determination of spare reserved extent in the determined group will involve the following situation: 1) there exists spare reserved extent(s) in one or more storage devices in the determined group; and 2) there exists no spare reserved extent in any of storage devices in the determined group.

Regarding the first situation, a spare reserved extent may be directly selected from the group, and it should be ensured the selected extent is located in a storage device other than storage devices where normal extents in the stripe are located. Regarding the second situation, a spare reserved extent may be selected from a storage device in other group than the determined group.

Figure 7A:
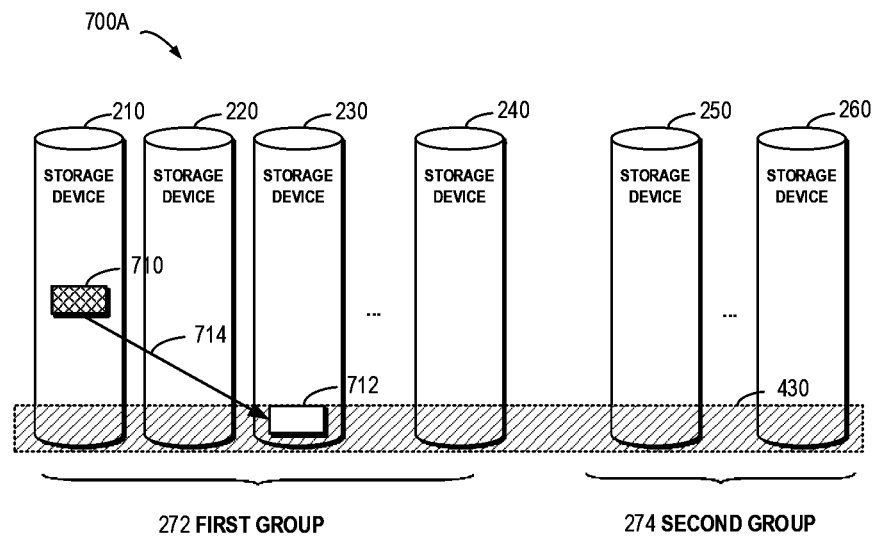
FIG. 7A schematically illustrates a block diagram for rebuilding an extent in a failed device to a storage device in a group to which the failed device belongs according to implementations of the present disclosure.
Figure 7B:
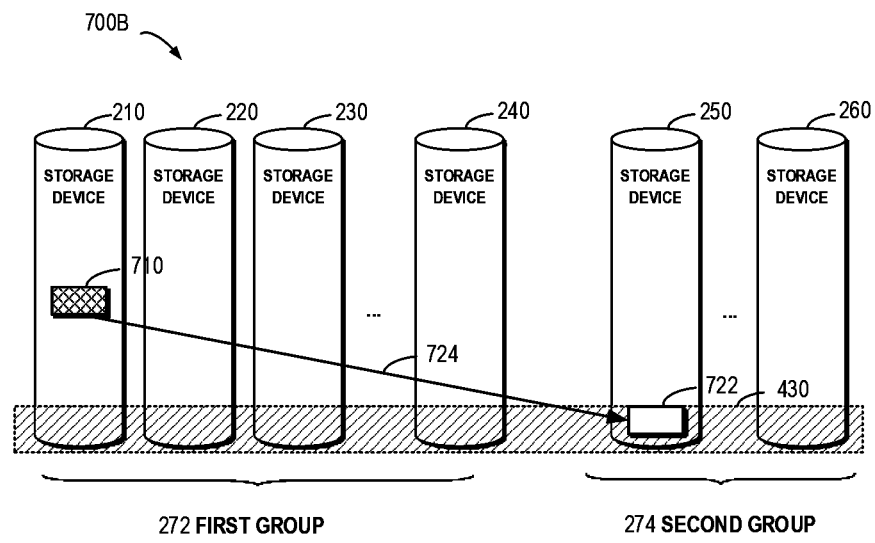
FIG. 7B schematically illustrates a block diagram for rebuilding an extent in a failed device to a storage device in other group than a group to which the failed device belongs according to implementations of the present disclosure.

At block 540, data in the extent are rebuilt to the selected spare reserved extent. It will be understood data in the failed extent may be recovered based on data in extent(s) located in a normal storage device in the stripe. With reference to FIGS. 7A and 7B, description is presented below on how to select a spare reserved extent from a storage device in the same or different group and how to rebuild data in a failed extent.

FIG. 7A schematically shows a block diagram 700A for rebuilding an extent in a failed device to a storage device in a group to which the failed device belongs. Suppose the storage device 210 fails, and data in an extent 710 in the storage device 210 needs to be rebuilt. At this point, first it may be determined whether there exists a spare reserved extent in various storage devices in the first group 272 or not. If yes, then a spare storage extent 712 may be directly selected from a storage device in the first group 272 in the reserved storage area 430.

Specifically, suppose a mapping relation of a stripe where the extent 710 is located is as shown in FIG. 6, and a storage device (i.e., storage device 210) where an extent with an address of "1:0:2" is located fails. As seen from the mapping relation 610, normal extents in the stripe are respectively located at storage devices with identifiers of 1-4 in the first group 272, at which point the spare storage extent 712 may be selected from a storage device than those with identifiers of 1-4. Subsequently, as shown by an arrow 714, data in the failed extent 710 may be recovered based on the mapping relation, and recovered data may be written to the spare storage extent 712.

FIG. 7B schematically shows a block diagram 700B for rebuilding an extent in a failed device to a storage device in other group than a group to which the failed device belongs. Continuing the example of FIG. 7A, suppose there exists no spare storage extent in any of storage devices in the first group 272, then a spare storage extent 722 may be selected from a storage device in the second group 274 in the reserved storage area 430. As seen from the mapping relation 610 in FIG. 6, all normal extents in the stripe belong to the first group 272, at which point a spare storage extent may be selected from any storage device in the second group 274 in the resource pool. Subsequently, as shown by an arrow 724, data in the failed extent 710 may be recovered based on the mapping relation 610, and recovered data may be written to the spare storage extent 722.

Figure 8:
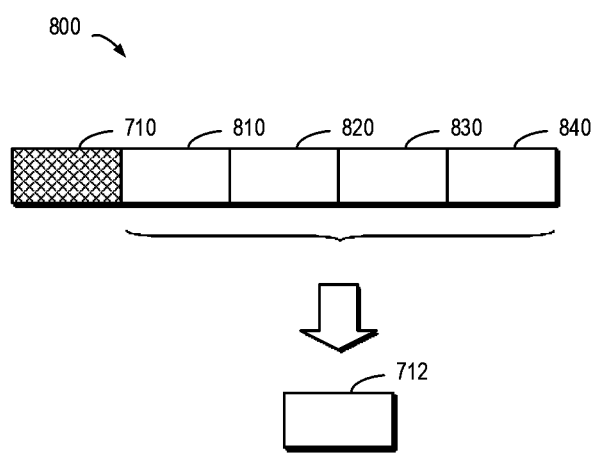
FIG. 8 schematically illustrates a block diagram for rebuilding an extent in a failed storage device according to implementations of the present disclosure.

According to example implementations of the present disclosure, at least one extent than the extent in the stripe may be determined, and data in the extent may be rebuilt based on data in the at least one other extent. According to example implementations of the present disclosure, the operation to rebuild data in the failed extent is similar to a conventional rebuild of RAID. With reference to FIG. 8, a detailed description is presented below. FIG. 8 schematically shows a block diagram 800 for rebuilding an extent in a failed device according to implementations of the present disclosure. In this figure, extents 810, 820, 830 and 840 are normal extents in the stripe where the failed extent 710 is located, at which point data in the failed extent 710 may be recovered based on data in these normal extents 810, 820, 830 and 840 and recovered data may be written to the extent 712.

According to example implementations of the present disclosure, suppose the extents 810, 820, 830 and 840 are used to store a data portion of user data, and the extent 710 is used to store a parity portion of user data. At this point, the parity portion may be re-determined based on data in the extents 810, 820, 830 and 840, and the determined parity portion may be written to the extent 712.

According to example implementations of the present disclosure, suppose the extents 710, 810, 820 and 830 are used to store a data portion of user data, and the extent 840 is used to store a parity portion of user data. At this point, a data portion that used to be stored in the extent 710 may be recovered based on data in the extents 810, 820 and 830 as well as the parity portion in the extent 840, and the recovered data portion may be written to the extent 712.

Figure 9:
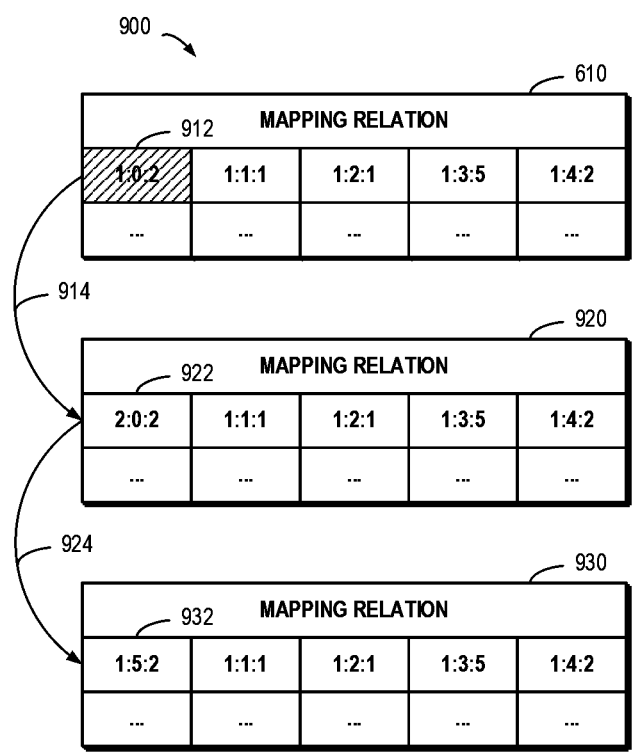
FIG. 9 schematically illustrates a block diagram of changes of a mapping relation between a stripe and multiple extents in the stripe according to implementations of the present disclosure.

According to example implementations of the present disclosure, since data in the failed extent 710 have been recovered to the selected spare reserved extent 712, the mapping relation is updated based on an address of the spare reserved extent 712. With reference to FIG. 9, description is presented below to detailed operations to update the mapping relation. FIG. 9 schematically shows a block diagram 900 of changes of a mapping relation between a stripe and multiple extents in the stripe according to implementations of the present disclosure.

In FIG. 9, the mapping relation 610 shows a mapping relation between a stripe and various extents before detecting a failed storage device, and a mapping relation 920 shows a mapping relation after recovering data in a failed extent to a selected spare reserved extent. At the initial running stage of the storage system, various extents in the stripe are located at addresses shown by the mapping relation 610. During the running of the storage system, it is detected a storage device where an extent at an address 912 is located fails, and a spare reserved extent (at an address 922) in a storage device in another group may be selected using the foregoing method. Subsequently, as shown by an arrow 914, data in the extent at the address 912 may be recovered to the extent at the address 922. Since rebuilt data are located at an extent other than the extent at the address 912, the mapping relation 610 of the stripe needs to be updated to the mapping relation 920. In this way, it may be ensured the mapping relation 920 indicates latest addresses of current extents in the stripe.

It will be understood although the occurrence of a failed storage device in the resource pool is allowed, the resource pool is not in a stable state at this point. Instead, after the failed storage device is detected in the resource pool, the failed storage device must be replaced with a backup storage device as soon as possible. According to example implementations of the present disclosure, after the replacement operation, stripes in the storage system may be migrated for various purposes. The migration may be performed for balancing loads. For example, stripes in multiple storage devices having heavier workloads may be migrated to storage devices having lighter workloads. Further, although a stripe distributed across multiple groups is allowed according to example implementations of the present disclosure, it needs to be ensured as far as possible extents in the stripe belong to the same group for the management purpose. Therefore, various extents in the stripe distributed across multiple groups may be migrated to storage devices in the same group.

It may be determined whether in the storage system there exists a target stripe which is distributed across storage devices in the first group and storage devices in the second group or not. If yes, a migration operation may be performed so that multiple extents in the migrated target stripe are located at storage devices in the same group. According to example implementations of the present disclosure, a special migration mark may be set to indicate extents in the stripe need to be migrated across groups.

According to example implementations of the present disclosure, after the target extent distributed across the first group and the second group is determined in the storage system, the migration mark may be set to indicate the target stripe is to be migrated across the first group and the second group. It will be understood since in the storage system there may further exist the operation of migration between storage devices within one group, the migration mark here is used by a mapping manager to distinguish two types of migration operations.

The migration mark may be sent to the mapping manager to instruct the mapping manager to initiate migration. If a migration request is received from the mapping manager, the target stripe will be migrated across the first group and the second group. Continuing the foregoing example of FIG. 9, the mapping relation 920 indicates a stripe is distributed across group 1 and group 2. At this point, the number of extents in each group may be determined first, and then migration may be performed based on the determined number. Specifically, among multiple extents in the target stripe, the first number of extents which are located at storage devices in the first group and the second number of extents which are located at storage devices in the second group may be determined, respectively. With reference to the mapping relation 920 in FIG. 9, it may be determined 4 extents (at addresses of "1:1:1," "1:2:1," "1:3:5" and "1:4:2" respectively) are located at storage devices in group 1, and only 1 extent (at an address of "2:0:2") is located at a storage device in group 2.

An extent in a group corresponding to a smaller number may be migrated. Specifically, if it is determined the first number is smaller than the second number, then at least one extent in storage devices in the first group are migrated to storage devices in the second group. Continuing the foregoing example, since only one extent is in group 2, at this point the extent in group 2 may be migrated to a storage device in group 1.

After the extent migration is completed, a mapping relation between the target stripe and multiple extents in the target stripe may be updated based on an address of the at least one migrated extent. Suppose the extent at the address 922 has been migrated from group 2 to an address "1:5:2" in group 1, then as shown by an arrow 924, the mapping relation may be updated based on the address "1:5:2", thereby obtaining an updated mapping relation 930. As shown by the mapping relation 930, at this point all 5 extents in the stripe are located at different storage devices in group 1.

It will be understood illustrated above is merely the situation where the target stripe is distributed across two groups. According to example implementations of the present disclosure, the target stripe may be distributed across more groups, at this point extents in multiple groups may be migrated to one group based on a mapping relation between the stripe and extents.

Figure 10:
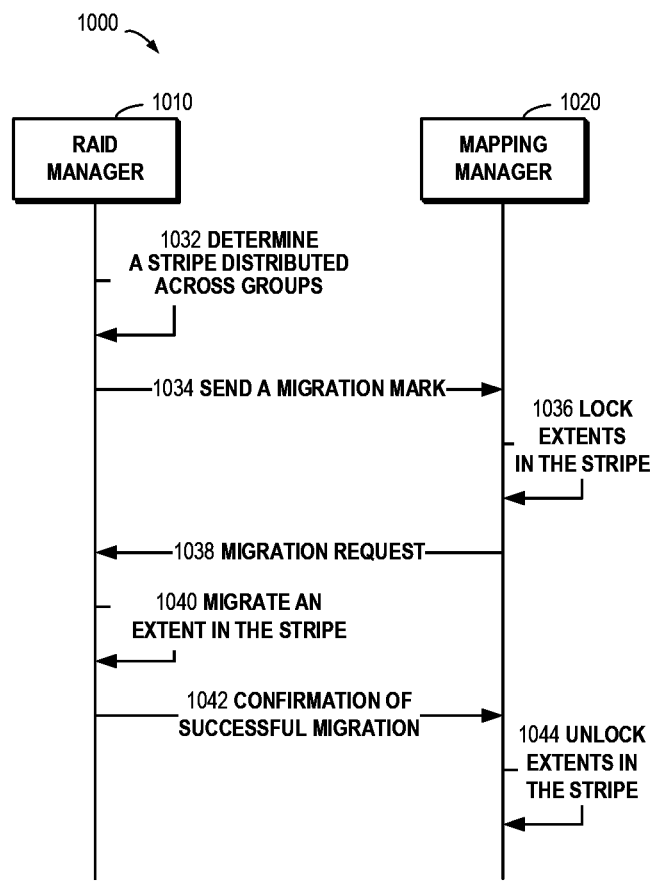
FIG. 10 schematically illustrates a block diagram of an operation to migrate a stripe according to implementations of the present disclosure.

According to example implementations of the present disclosure, the storage system may include a mapping manager for managing the mapping relation. With reference to FIG. 10, description is presented below to more details about migration. FIG. 10 schematically shows a block diagram 1000 of an operation to migrate a stripe according to implementations of the present disclosure. As depicted, the storage system may include a RAID manager 1010 for managing storage devices in the resource pool. Further, the storage system may include a mapping manager 1020 for managing the mapping relation.

At 1032, it may be determined at the RAID manager 1010 whether or not there exists a stripe across groups in the storage system. If yes, then at 1034 a migration mark is sent to the mapping manager 1020. It will be understood in order to ensure data consistency in the storage system, a write operation to any extent in the stripe where a to-be-migrated extent is located should be prohibited during migration. Therefore, at 1036 the mapping manager 1020 may lock various extents in the stripe.

At 1038, the mapping manager 1020 may send a migration request to the RAID manager 1010 so as to indicate an extent in the stripe needs to be migrated across groups. Subsequently, the migration operation is performed at the RAID manager 1010, and after successful migration of the relevant extent, confirmation of successful migration is sent to the mapping manager 1020. Upon receipt of the confirmation of successful migration, the mapping manager 1020 may unlock extents which are locked at 1036.

Description regarding how to migrate an extent in a stripe across multiple groups has been presented with reference to FIG. 10. According to example implementations of the present disclosure, there may be a workload unbalance among various storage devices in a group, and thus a stripe may be migrated within the group so as to strike a workload balance among storage devices. Further, multiple extents in a stripe may be migrated as a whole. For example, when each storage device in a group has a high workload, then the stripe in the group may be migrated to a group with a lighter workload.

According to example implementations of the present disclosure, respective workloads of multiple storage devices in the storage system may be determined first. It will be understood the workload here may include multiple aspects, for example, may include utilization efficiency of storage space in each storage device, a frequency at which each storage device is accessed, utilization efficiency of processing resources in each storage device, wear degree of each storage device, etc.

Description is presented below by only taking utilization efficiency of storage space in a storage device as an example. A target stripe may be selected from multiple stripes in the storage system based on utilization efficiency of storage space, here multiple extents included in the target stripe are located at multiple storage devices with higher utilization efficiency in the resource pool. Further, multiple storage devices with lower utilization efficiency may be selected from the resource pool, and the target stripe may be migrated to the selected multiple storage devices in the resource pool. Here, the utilization efficiency of the selected multiple storage devices is lower than utilization efficiency of multiple storage devices where the target stripe is located.

According to example implementations of the present disclosure, the migration operation may be initiated by the mapping manager described above. The mapping manager may lock various extents in the target stripe and instruct the RAID manager to initiate migration. Subsequently, in response to receiving an initiation request from the mapping manager, the RAID manager migrates the target stripe from first multiple storage devices to second multiple storage devices.

While examples of the method according to the present disclosure have been described in detail with reference to FIGS. 2 to 10, description is presented below to the implementation of a corresponding apparatus. According to example implementations of the present disclosure, provided is an apparatus for managing a storage system. The apparatus includes: a detecting module configured to detect a failed storage device among a plurality of storage devices included in a resource pool of the storage system, the plurality of storage devices belonging to a first group and a second group in the resource pool respectively; a determining module configured to determine in the failed storage device an extent which has been assigned for building a stripe in the storage system; a selecting module configured to select a spare reserved extent from respective reserved extents in respective storage devices among the plurality of storage devices based on a mapping relation between the stripe and plurality of extents in the stripe, the respective reserved extents being shared among the first group and the second group; and a rebuilding module configured to rebuild data in the extent to the selected spare reserved extent. It will be understood the respective modules here may be configured to perform steps of each method described above, which will be ignored below.

Figure 11:
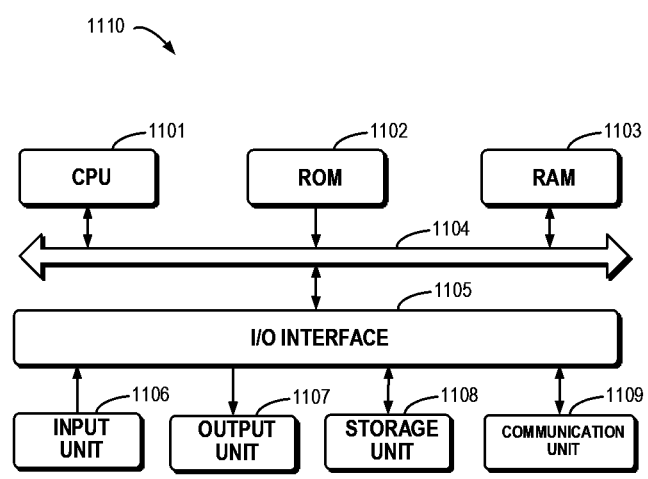
FIG. 11 schematically illustrates a block diagram of a device for managing a storage system according to example implementations of the present disclosure.

FIG. 11 schematically shows a block diagram of a device 1100 for managing a storage system according to example implementations of the present disclosure. As depicted, the device 1100 includes a central process unit (CPU) 1101, which can execute various suitable actions and processing based on the computer program instructions stored in the read-only memory (ROM) 1102 or computer program instructions loaded in the random-access memory (RAM) 1103 from a storage unit 1108. The RAM 1103 can also store all kinds of programs and data required by the operations of the device 1100. CPU 1101, ROM 1102 and RAM 1103 are connected to each other via a bus 1104. The input/output (I/O) interface 1105 is also connected to the bus 1104.

A plurality of components in the device 1100 is connected to the I/O interface 1105, including: an input unit 1106, such as keyboard, mouse and the like; an output unit 1107, e.g., various kinds of display and loudspeakers etc.; a storage unit 1108, such as magnetic disk and optical disk etc.; and a communication unit 1109, such as network card, modem, wireless transceiver and the like. The communication unit 1109 allows the device 1100 to exchange information/data with other devices via the computer network, such as Internet, and/or various telecommunication networks.

The above described each process and treatment, such as the method 500, can also be executed by the processing unit 1101. For example, in some implementations, the method 500 can be implemented as a computer software program tangibly included in the machine-readable medium, e.g., the storage unit 1108. In some implementations, the computer program can be partially or fully loaded and/or mounted to the device 1100 via ROM 1102 and/or the communication unit 1109. When the computer program is loaded to the RAM 1103 and executed by the CPU 1101, one or more steps of the above described method 500 can be implemented. Alternatively, in other implementations, the CPU 1101 also can be configured in other suitable manners to realize the above procedure/method.

According to example implementations of the present disclosure, there is provided a device for managing a storage system, the device including: at least one processor; a volatile memory; and a memory coupled to the at least one processor, the memory having instructions stored thereon, the instructions, when executed by the at least one processor, causing the device to perform acts. The acts include: detecting a failed storage device among a plurality of storage devices included in a resource pool of the storage system, the plurality of storage devices belonging to a first group and a second group in the resource pool respectively; determining an extent in the failed storage device which has been assigned for building a stripe in the storage system; selecting a spare reserved extent from respective reserved extents included in respective storage devices among the plurality of storage devices based on a mapping relation between the stripe and a plurality of extents in the stripe, the respective reserved extents being shared among the first group and the second group; and rebuilding data in the extent to the selected spare reserved extent.

According to example implementations of the present disclosure, the storage system is based on Redundant Array of Independent Disks, and selecting the spare reserved extent from the respective reserved extents based on the mapping relation includes: selecting the spare reserved extent from respective reserved extents in storage devices among the plurality of storage devices other than respective storage devices where the plurality of extents are located.

According to example implementations of the present disclosure, selecting the spare reserved extent from respective reserved extents in storage devices among the plurality of storage devices other than respective storage devices where the plurality of extents are located includes: determining a group to which the failed storage device belongs; and selecting a spare reserved extent included in a storage device in the group.

According to example implementations of the present disclosure, selecting the spare reserved extent from respective reserved extents in storage devices among the plurality of storage devices other than respective storage devices where the plurality of extents are located includes: in response to determining no storage device in the group includes a spare reserved extent, selecting the spare reserved extent from a storage device in a further group other than the group.

According to example implementations of the present disclosure, rebuilding data in the extent to the selected spare reserved extent includes: determining at least one other extent than the extent in the stripe; rebuilding data in the extent based on data in the at least one other extent; and updating the mapping relation between an address of the spare reserved extent.

According to example implementations of the present disclosure, the acts further include: in response to determining the failed storage device has been replaced by a normal storage device, determining a target stripe in the storage system which is distributed across storage devices in the first group and storage devices in the second group; and migrating the target stripe so that plurality of extents in the migrated target stripe are located at storage devices in the same group.

According to example implementations of the present disclosure, the storage system includes a mapping manager for managing the mapping relation, and migrating the target stripe includes: setting a migration mark for indicating the target stripe is to be migrated across the first group and the second group; sending the migration mark to the mapping manager to instruct the mapping manager to initiate migration; and in response to receipt of a migration request from the mapping manager, migrating the target stripe across the first group and the second group.

According to example implementations of the present disclosure, migrating the target stripe across the first group and the second group includes: determining the first number of extents among plurality of extents in the target stripe which are located at storage devices in the first group and the second number of extents among the plurality of extents which are located at storage devices in the second group; in response to determining the first number is smaller than the second number, migrating at least one extent located at storage devices in the first group to a storage device in the second group; and updating a mapping relation between the target stripe and plurality of extents in the target stripe based on an address of the migrated at least one extent.

According to example implementations of the present disclosure, the acts further include: determining respective workloads of plurality of storage devices in the storage system; selecting a target stripe from plurality of stripes in the storage system based on the respective workloads, plurality of extents included in the target stripe being located at a first plurality of storage devices in the resource pool; and migrating the target stripe to a second plurality of storage devices in the resource pool, workloads of the second plurality of storage devices being lower than workloads of the first plurality of storage devices.

According to example implementations of the present disclosure, the storage system includes a mapping manager for managing the mapping relation, and migrating the target stripe to the second plurality of storage devices in the resource pool includes: requesting the mapping manager to initiate migration; and in response to receipt of an initiation request from the mapping manager, migrating the target stripe from the first plurality of storage devices to the second plurality of storage devices.

According to example implementations of the present disclosure, there is provided a computer program product. The computer program product is tangibly stored on a non-transient computer readable medium and includes machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate a device for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method for managing a storage system, the method comprising:

detecting a failed storage device among a plurality of storage devices included in a resource pool of the storage system, wherein the storage devices included in the resource pool of the storage system each have the same storage space capacity, the plurality of storage devices being divided into a first group and a second group in the resource pool respectively, wherein the first group comprises multiple storage devices, wherein the second group comprises multiple storage devices, wherein the multiple storage devices in the first group are all different from the multiple storage devices in the second group, and wherein each individual RAID (Redundant Array of Independent Disks) stripe in the storage system is initially built by the storage system using extents that are located in either i) only storage devices that are contained within the first group or ii) only storage devices that are contained within the second group;

determining an extent in the failed storage device which has been assigned for building a stripe in the storage system, wherein the stripe comprises a RAID stripe;

selecting a spare reserved extent from respective reserved extents included in respective storage devices among the plurality of storage devices based on a mapping relation between the stripe and a plurality of extents in the stripe, the respective reserved extents being shared among the first group and the second group, wherein each one of the respective reserved extents has a reserved storage area equal to the storage space capacity of each one of the storage devices in the pool divided by a sum of i) a total number of storage devices in the first group and ii) a total number of storage devices in the second group, and wherein the selecting of the spare reserved extent from respective reserved extents included in respective storage devices among the plurality of storage devices including selecting the spare reserved extent from respective reserved extents in storage devices among the plurality of storage devices other than respective storage devices located where the plurality of extents are located, at least in part by:

determining a group to which the failed storage device belongs, determining whether any storage device in the group to which the failed storage device belongs contains a spare reserved extent, and in response to determining that no storage device in the group to which the failed storage device belongs contains a spare reserved extent, selecting a spare reserved extent located in a storage device in the group other than the group to which the failed storage device belongs; and rebuilding data in the extent to the selected spare reserved extent.

2. The method of claim 1, wherein rebuilding data in the extent to the selected spare reserved extent comprises:

determining at least one other extent than the extent in the stripe;

rebuilding data in the extent based on data in the at least one other extent; and updating the mapping relation between an address of the spare reserved extent.

3. The method of claim 1, further comprising:

in response to determining the failed storage device has been replaced by a normal storage device, determining a target stripe in the storage system which is distributed across storage devices in the first group and storage devices in the second group; and migrating the target stripe so that plurality of extents in the migrated target stripe are located at storage devices in the same group.

4. The method of claim 3, wherein the storage system comprises a mapping manager for managing the mapping relation, and wherein migrating the target stripe comprises:

setting a migration mark for indicating the target stripe is to be migrated across the first group and the second group;

sending the migration mark to the mapping manager to instruct the mapping manager to initiate migration; and in response to receipt of a migration request from the mapping manager, migrating the target stripe across the first group and the second group.

5. The method of claim 4, wherein migrating the target stripe across the first group and the second group comprises:

determining a first number of extents that are located at storage devices in the first group and are among a plurality of extents in the target stripe and a second number of extents that are located at storage devices in the second group and are among the plurality of extents in the target stripe;

in response to determining the first number is smaller than the second number, migrating at least one extent located at storage devices in the first group to a storage device in the second group; and updating a mapping relation between the target stripe and plurality of extents in the target stripe based on an address of the migrated at least one extent.

6. The method of claim 1, further comprising:

determining respective workloads of plurality of storage devices in the storage system;

selecting a target stripe from plurality of stripes in the storage system based on the respective workloads, plurality of extents included in the target stripe being located at a first plurality of storage devices in the resource pool; and migrating the target stripe to a second plurality of storage devices in the resource pool, workloads of the second plurality of storage devices being lower than workloads of the first plurality of storage devices.

7. The method of claim 6, wherein the storage system comprises a mapping manager for managing the mapping relation, and wherein migrating the target stripe to the second plurality of storage devices in the resource pool comprises:
  requesting the mapping manager to initiate migration; and
  in response to receipt of an initiation request from the mapping manager, migrating the target stripe from the first plurality of storage devices to the second plurality of storage devices.

8. A device for managing a storage system, comprising:
  at least one processor;
  a volatile memory; and
  a memory coupled to the at least one processor and having instructions stored thereon, the instructions, when executed by the at least one processor, causing the device to perform acts comprising:
  detecting a failed storage device among a plurality of storage devices included in a resource pool of the storage system, wherein the storage devices included in the resource pool of the storage system each have the same storage space capacity, the plurality of storage devices being divided into a first group and a second group in the resource pool respectively, wherein the first group comprises multiple storage devices, wherein the second group comprises multiple storage devices, wherein the multiple storage devices in the first group are all different from the multiple storage devices in the second group, and wherein each individual RAID (Redundant Array of Independent Disks) stripe in the storage system is initially built by the storage system using extents that are located in either i) only storage devices that are contained within the first group or ii) only storage devices that are contained within the second group;
  determining an extent in the failed storage device which has been assigned for building a stripe in the storage system, wherein the stripe comprises a RAID stripe;
  selecting a spare reserved extent from respective reserved extents included in respective storage devices among the plurality of storage devices based on a mapping relation between the stripe and a plurality of extents in the stripe, the respective reserved extents being shared among the first group and the second group, wherein each one of the respective reserved extents has a reserved storage area equal to the storage space capacity of each one of the storage devices in the pool divided by a sum of i) a total number of storage devices in the first group and ii) a total number of storage devices in the second group, and wherein the selecting of the spare reserved extent from respective reserved extents included in respective storage devices among the plurality of storage devices including selecting the spare reserved extent from respective reserved extents in storage devices among the plurality of storage devices other than respective storage devices located where the plurality of extents are located, at least in part by:
    determining a group to which the failed storage device belongs,
    determining whether any storage device in the group to which the failed storage device belongs contains a spare reserved extent, and
    in response to determining that no storage device in the group to which the failed storage device belongs contains a spare reserved extent, selecting a spare reserved extent located in a storage device in the group other than the group to which the failed storage device belongs; and
  rebuilding data in the extent to the selected spare reserved extent.

9. The device of claim 8, wherein rebuilding data in the extent to the selected spare reserved extent comprises:
  determining at least one other extent than the extent in the stripe;
  rebuilding data in the extent based on data in the at least one other extent; and
  updating the mapping relation between an address of the spare reserved extent.

10. The device of claim 8, wherein the acts further comprise:
  in response to determining the failed storage device has been replaced by a normal storage device, determining a target stripe in the storage system which is distributed across storage devices in the first group and storage devices in the second group; and
  migrating the target stripe so that plurality of extents in the migrated target stripe are located at storage devices in the same group.

11. The device of claim 10, wherein the storage system comprises a mapping manager for managing the mapping relation, and wherein migrating the target stripe comprises:
  setting a migration mark for indicating the target stripe is to be migrated across the first group and the second group;
  sending the migration mark to the mapping manager to instruct the mapping manager to initiate migration; and
  in response to receipt of a migration request from the mapping manager, migrating the target stripe across the first group and the second group.

12. The device of claim 11, wherein migrating the target stripe across the first group and the second group comprises:
  determining a first number of extents that are located at storage devices in the first group and are among a plurality of extents in the target stripe and a second number of extents that are located at storage devices in the second group and are among the plurality of extents in the target stripe;
  in response to determining the first number is smaller than the second number, migrating at least one extent located at storage devices in the first group to a storage device in the second group; and
  updating a mapping relation between the target stripe and plurality of extents in the target stripe based on an address of the migrated at least one extent.

13. The device of claim 8, wherein the acts further comprise:
  determining respective workloads of plurality of storage devices in the storage system;
  selecting a target stripe from plurality of stripes in the storage system based on the respective workloads, plurality of extents included in the target stripe being located at a first plurality of storage devices in the resource pool; and
  migrating the target stripe to a second plurality of storage devices in the resource pool, workloads of the second plurality of storage devices being lower than workloads of the first plurality of storage devices.

14. A computer program product having a non-transitory computer readable medium which stores a set of instructions to manage a storage system; the set of instructions, when carried out by computerized circuitry, causing the computerized circuitry to perform a method of:
  detecting a failed storage device among a plurality of storage devices included in a resource pool of the storage system, wherein the storage devices included in the resource pool of the storage system each have the same storage space capacity, the plurality of storage devices being divided into a first group and a second group in the resource pool respectively, wherein the first group comprises multiple storage devices, wherein the second group comprises multiple storage devices, wherein the multiple storage devices in the first group are all different from the multiple storage devices in the second group, and wherein each individual RAID (Redundant Array of Independent Disks) stripe in the storage system is initially built by the storage system using extents that are located in either i) storage devices that are contained within the first group or ii) only storage devices that are contained within the second group;

determining an extent in the failed storage device which has been assigned for building a stripe in the storage system, wherein the stripe comprises a RAID stripe;

selecting a spare reserved extent from respective reserved extents included in respective storage devices among the plurality of storage devices based on a mapping relation between the stripe and a plurality of extents in the stripe, the respective reserved extents being shared among the first group and the second group, wherein each one of the respective reserved extents has a reserved storage area equal to the storage space capacity of each one of the storage devices in the pool divided by a sum of i) a total number of storage devices in the first group and ii) a total number of storage devices in the second group, and wherein the selecting of the spare reserved extent from respective reserved extents included in respective storage devices among the plurality of storage devices including selecting the spare reserved extent from respective reserved extents in storage devices among the plurality of storage devices other than respective storage devices located where the plurality of extents are located, at least in part by:

determining a group to which the failed storage device belongs, determining whether any storage device in the group to which the failed storage device belongs contains a spare reserved extent, and in response to determining that no storage device in the group to which the failed storage device belongs contains a spare reserved extent, selecting a spare reserved extent located in a storage device in the group other than the group to which the failed storage device belongs; and rebuilding data in the extent to the selected spare reserved extent.

* * * * *